United States Patent Office 3,098,870
Patented July 23, 1963

3,098,870
PREPARATION OF ALKYL o-CARBOXYBENZYL SULFONES
Maurice J. Schlatter, Kensington, Calif., assignor to California Research Corporation, San Francisco, Calif., a corporation of Delaware
No Drawing. Filed Mar. 5, 1962, Ser. No. 177,249
4 Claims. (Cl. 260—515)

The present invention relates to the new compounds alkyl o-carboxybenzyl sulfones, which can be represented by the structural formula

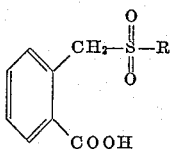

wherein R is an alkyl group of about 12 to 18 carbon atoms. These materials are useful as valuable intermediates. For example, in the form of water-soluble salts, they can be employed in the preparation of detergent compositions.

This is a continuation-in-part of copending application Serial No. 24,268, filed April 25, 1960, now abandoned.

The novel compounds can be prepared from the corresponding alkyl o-carboxybenzyl sulfides by oxidation in accordance with the following equation:

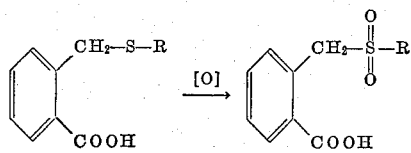

In turn, the alkyl o-carboxybenzyl sulfide can be prepared by the radical addition of the appropriate olefin to o-mercaptomethylbenzoic acid in accordance with the equation:

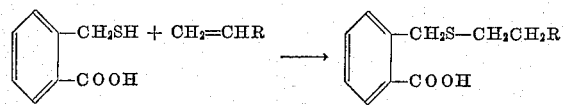

In effecting the oxidation of the sulfide to the sulfone, a convenient method involves contacting the sulfide with hydrogen peroxide in an acid medium. Temperatures of contact can range from 25° C. to 150° C., preferably 80° C. to 100° C., and the pH of the reaction mixture from 2 to 6. Moreover, it is preferred to operate with a stoichiometric excess of hydrogen peroxide; accordingly, 1.5 mols to 6 mols of hydrogen peroxide per mol of the sulfide will be found satisfactory. The hydrogen peroxide is conveniently employed in an aqueous solution thereof, and solutions containing 30% by weight of peroxide are readily available. Following reaction, which can take place in times varying from minutes to hours depending on the temperature, pH and amount of excess hydrogen peroxide, e.g., 20 minutes to 2 hours, the mixture is cooled and diluted with water. The sulfone product precipitates and can be purified by recrystallization from absolute ethanol.

The following examples are given to illustrate the practice of the invention, but are not to be construed as limiting the invention thereto, since the general applicability of the principles involved therein will readily occur to those skilled in the art.

Example I (A) *Preparation of n-dodecyl o-carboxybenzyl sulfide.*—A suspension of o-mercaptomethylbenzoic acid in an amount of 16.8 g. (0.1 mol), in 80 ml. of absolute ethanol, is neutralized with 0.1 mol of Claisen's alkali (prepared by dissolving 350 g. potassium hydroxide in 250 ml. of water and diluting to 1000 cc. with methanol). Freshly distilled 1-dodecene (25.3 g., 0.15 mol) is added and the mixture diluted to 200 ml. with absolute alcohol. The clear solution is irradiated with an 8 watt quartz-mercury ultraviolet pencil axially located in a 38 mm. x 160 mm. tube containing the reaction mixture. The temperature of the solution is maintained at 30° C. by a water-cooling bath. Disappearance of —SH groups is followed by titrating 2 ml. aliquots with 0.1 N iodine solution. When conversion determined in this way is more than 85% complete, e.g., 88% after seven days, the clear liquid is decanted off, the solid which precipitates is dissolved in alcohol, the solution clarified by filtration, and the filtrate recombined with the other portion of the reaction mixture. Solvent and excess olefin are removed by concentrating the solution by distillation from a water bath at 70° C. in vacuo.

The 1-olefin adduct can be isolated as follows:

The residue is dissolved in 80 ml. of 1 N potassium hydroxide, extracted with ether to remove any neutral by-products or reactants and then acidified with concentrated hydrochloric acid. The precipitate (11.7 g., 45% yield) consists of n-dodecyl o-carboxybenzyl sulfide. Recrystallization from ethanol gives compact rosettes of fine, colorless needles, M.P. 97.8°–98.3° C. The product analyzes as follows:

|  | C | H | S | Neutral Equivalent |
|---|---|---|---|---|
| Calculated | 71.38 | 9.59 | 9.52 | 336.52 |
| Found | 71.10; 70.98 | 10.04; 9.89 | 9.3; 9.4 | 339.0 |

Heating the product with p-toluenesulfonic acid gives n-tetradecyl sulfide, thiophthalide and phthalide. Further, reaction of the 1-dodecene adduct with hydrobromic acid and acetic acid yields, respectively, n-tetradecyl bromide and n-tetradecyl acetate.

(B) *Preparation of n-dodecyl o-carboxybenzyl sulfone.*—An excess of a 30% water solution of hydrogen peroxide (3.8 g.) is added over a period of 20 minutes at 90° to 105° C. to 3.6 g. (0.01 mol) of n-dodecyl o-carboxybenzyl sulfide and 0.3 g. of 85% phosphoric acid dissolved in 3.3 ml. of glacial acetic acid. The mixture is heated at 100° C. for an additional 1.25 hours, cooled, diluted with water and the precipitate filtered off. Recrystallization of this from absolute ethanol gives 2.61 g. of pure n-dodecyl o-carboxybenzyl sulfone as colorless platelets, having a melting point of 136.6° to 137.2° C. Recovery of recrystallized product is 71% of theory. The product analyzes as follows:

|  | C | H | S | Neutral Equivalent |
|---|---|---|---|---|
| Calculated | 65.18 | 8.75 | 8.70 | 368.52 |
| Found | 65.37; 65.50 | 8.81; 8.90 | 8.79; 8.83 | 377 |

Example II (A) *Preparation of n-hexadecyl o-carboxybenzyl sulfide.*—The addition reaction to yield this product is initiated by bubbling air at a rate of 1 ml. per minute through an alcohol solution of the reactants at 25° C. The reaction mixture is prepared from 58.2 g. (0.35 mol) of o-mercaptomethylbenzoic acid and 128.2 g. (0.525 mol) of redistilled 1-hexadecene dissolved in absolute ethanol to give 1025 ml. of solution. Conversion of —SH groups is followed by iodine titration. Conversions are about 29% at 16 hours, and 35% at 51 hours. At this point the product precipitate is filtered off (40.2 g.). Recrystallization of the product precipitate from absolute ethanol, yields compact rosettes of colorless needles. Melting point of the dried product is 103.5 to 104.0° C. The product analyzes as follows:

|  | C | H | Neutral Equivalent |
|---|---|---|---|
| Calculated | 73.41 | 10.27 | 392.62 |
| Found | 72.68; 72.71 | 10.47; 10.51 | 384 |

Acid cleavage of the product as with p-toluene-sulfonic acid yields n-hexadecyl sulfide, thiophthalide and phthalide. Reaction of the product with hydrobromic acid and acetic acid yields, respectively, n-hexadecyl bromide and n-hexadecyl acetate.

(B) *Preparation of n-hexadecyl o-carboxybenzyl sulfone.*—n-Hexadecyl o-carboxybenzyl sulfide (3.14 g., 0.008 mol) is dissolved in 3.5 ml. of glacial acetic acid containing 0.3 g. of 85% phosphoric acid. Excess 30% hydrogen peroxide (3.0 g., 0.0264 mol) is added to this solution over a period of 30 minutes while stirring on a steam bath. Stirring is continued for an additional 105 minutes. The mixture is allowed to cool, 50 ml. of water is added and the white platelets that separate are filtered off, washed with water and air-dried. Recrystallizing this product from absolute alcohol gives colorless plates melting at 132.3–132.9° C. Recovery of recrystallized product is 85% of theory. The product analyzes as follows:

|  | C | H | S | Neutral Equivalent |
|---|---|---|---|---|
| Calculated | 67.88 | 9.50 | 6.55 | 424.62 |
| Found | 67.01; 67.20 | 9.22; 9.33 | 7.34 | 418 |

*Example III*

*Preparation of n-tetradecyl o-carboxybenzyl sulfide.*—n-Tetradecyl o-carboxybenzyl sulfide is prepared substantially as in Example IIA, employing 103 g. of redistilled 1-tetradecene in place of 1-hexadecene. Adduct isolated corresponds to about 62% of theory based on o-mercaptobenzoic acid charged. Recrystallized from methanol, compact rosettes of colorless needles melting at 102.0 to 102.4° C. are obtained.

Following the procedure of Example IIB, the above obtained sulfide is oxidized to the corresponding n-tetradecyl o-carboxybenzyl sulfone.

*Example IV*

Following the procedures of Example II, 1-octadecene in an amount of 132.5 g. is added to the o-mercaptomethylbenzoic acid. Following preparation and isolation from methanol, the pure product is oxidized to the corresponding n-octadecyl o-carboxybenzyl sulfone.

As indicated, the novel compounds herein described and claimed can be used in the form of their water-soluble salts admixed with 60 to 90% by weight, based on finished composition, of the commonly employed water-soluble detergent builders to form detergent compositions.

The salts have the formula

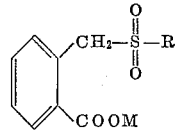

wherein M is an alkali or alkaline earth metal, such as sodium, potassium, calcium, or magnesium.

The water-soluble salts can be prepared in known fashion by simple neutralization of the acid precursor with an aqueous solution of a base of the desired metal, followed by drying, whereupon a dry powder is obtained.

The detergency effectiveness of the salt derivatives herein described are tested employing the Terg-O-Tometer test, and Foster D. Snell soiled cotton, as described in "Detergency Evaluation and Testing," by J. C. Harris, Interscience Manual 4, Interscience Publishers, Inc., New York.

In carrying out the test, the following formulation is used: 20% sodium salt of n-dodecyl o-carboxybenzyl sulfone as the active detergent component, 50% sodium tripolyphosphate, 5% "N" silicate,* 1% carboxymethyl cellulose, and 24% sodium sulfate.

Water of 300 p.p.m. hardness (2 parts calcium, 1 part magnesium calculated as the carbonates) is used. Concentration of the formulation in the water is 0.3%. Percent soil removal is 31. A blank sample containing detergent builders with water replacing the active detergent component gives a soil removal of around 12%. The use of the sodium salt of n-tetradecyl o-carboxybenzyl sulfone as the active detergent in the same formulation gives a soil removal value of around 50%.

I claim:
1. n-Alkyl o-carboxybenzyl sulfones having 12 to 18 carbon atoms in the alkyl group.
2. n-Dodecyl o-carboxybenzyl sulfone.
3. n-Tetradecyl o-carboxybenzyl sulfone.
4. n-Hexadecyl o-carboxybenzyl sulfone.

---

* $SiO_2:Na_2O$ weight ratio of 3.22:1.

No references cited.